United States Patent [19]

Clausen

[11] Patent Number: 5,471,786

[45] Date of Patent: Dec. 5, 1995

[54] PLANT GROWING MEDIUM CONTAINING MINERAL FIBERS

[75] Inventor: Ulf A. Clausen, Køge, Denmark

[73] Assignee: Rockwool International A/S, Hedehusene, Denmark

[21] Appl. No.: 254,678

[22] Filed: Jun. 6, 1994

Related U.S. Application Data

[63] Continuation of Ser. No. 867,213, filed as PCT/DK90/00320, Dec. 7, 1990, published as WO91/08662, Jun. 27, 1991, abandoned.

[30] Foreign Application Priority Data

Dec. 8, 1989 [DK] Denmark .................. 6198/89

[51] Int. Cl.$^6$ .................................. A01G 31/00
[52] U.S. Cl. .................................................. 47/59
[58] Field of Search ................... 47/59, 58 HP, 47/81

[56] References Cited

U.S. PATENT DOCUMENTS

| 4,369,054 | 1/1983 | Shinholster, Jr. et al. | 71/25 |
| 4,959,926 | 10/1990 | Moffet, Jr. | 47/59 |
| 5,127,187 | 7/1992 | Hattori et al. | 47/59 |

FOREIGN PATENT DOCUMENTS

| 248777 | 12/1987 | European Pat. Off. | |
| 310501 | 4/1989 | European Pat. Off. | A01G 31/00 |
| 227872 | 10/1985 | German Dem. Rep. | A01G 31/00 |
| 3121227 | 12/1982 | Germany . | |
| 3425934 | 1/1986 | Germany | C05G 3/04 |

OTHER PUBLICATIONS

Römpp Chemie Lexikon, p. 2511 (Thieme Publishers), 1983.
Ullmanns Encyclopädie der technischen Chemie, pp. 333–335 (1983) (Verlag Chemie).
The Merck Index, 11th Ed. Budavari et al., 1989. pp. 180, 668 and 692.

Primary Examiner—Raymond Henley, III
Assistant Examiner—K. Weddington
Attorney, Agent, or Firm—Watson, Cole, Grindle & Watson

[57] ABSTRACT

A mineral fibre containing plant growing medium comprising lignite has ion exchange capacity and improved water retention properties and does not require disinfection before use.

7 Claims, 1 Drawing Sheet

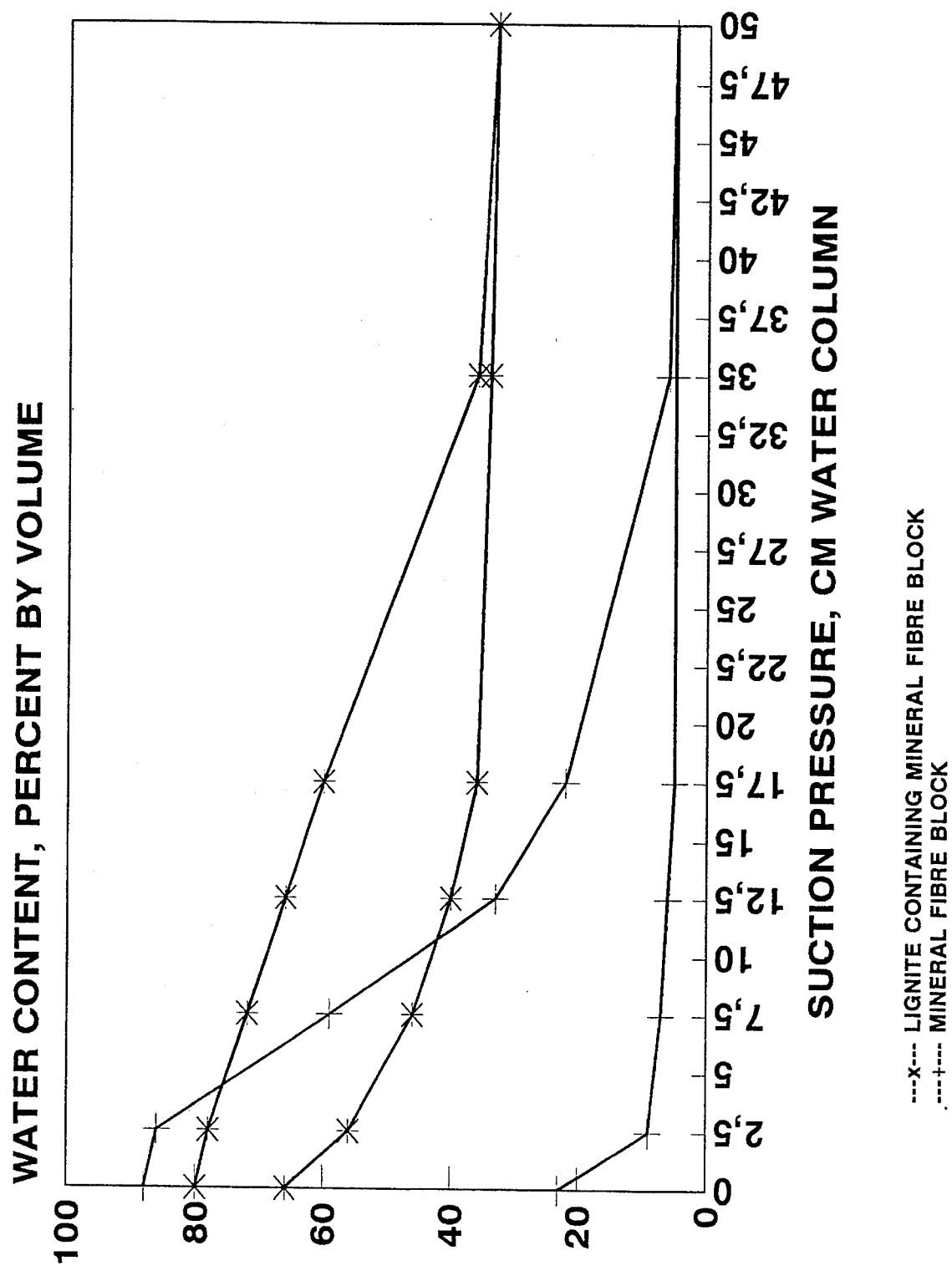

PLANT GROWING MEDIUM CONTAINING MINERAL FIBERS

CROSS REFERENCE TO RELATED APPLICATION

This application is a continuation of application Ser. No. 867,213, filed as PCT/DK90/00320, Dec. 7, 1990, published as WO91/08662, Jun. 27, 1991, now abandoned.

The present invention relates to a plant growing medium comprising mineral fibers and an agent for increasing the water retention ability.

Plant growing media containing mineral fibers may be found both in the bound form, e.g., in the form of blocks as disclosed in GB patent specification No. 1,336,426, and in the unbound form. Whether a plant growing medium is present in the bound or in the unbound form, it should be porous so that sufficient water and air can be supplied for the plants to germinate and grow in the growing medium. Furthermore the growing medium should have a good water retention ability.

Plant growing blocks may for example be used as a germinating medium and for rooting plants under controlled growth conditions, e.g. in a greenhouse, followed by the transplantation of the blocks containing the germinated plants. In connection with the transplantation, it is vital that the water retention ability of the growing medium is sufficient to avoid plant detrimental drainage.

The term "water retention ability" of a growing medium denotes both the ability to resist drainage and the water resuction ability (the rewetting ability). In characterizing the water retention ability of a given product, a so-called water retention curve is used which is determined by a measurement wherein the test medium is mounted on a support, such as sand or soil, the support having a certain depth, and wherein the height level of a saturated water zone can be raised and lowered continuously. The water retention curve expresses the connection between the distance from the bottom of the medium (the top of the support) down to the surface of the underlying water saturated zone, which distance is referred to as the suction pressure in the following, and the corresponding water content in the medium. The retention curve which is a so-called hysteresis curve consists of two curve parts, namely one for increasing suction pressure (drainage) and one for decreasing suction pressure (rewetting). The hysteresis is the distance between the two curve parts measured in percent by weight or by volume of water at a given suction pressure.

In prior art mineral fiber containing plant growing media the pore size and the variation of pore sizes generally have the effect that smaller pore size and smaller variation herein provide improved water retention and rewetting ability and lesser hysteresis.

Growing media should, however, have a certain average pore diameter and such a variation in pore sizes that a sufficient content of air and water is secured, both during the propagation phase and for a certain period following the transplantation.

Attempts have been made to use plant growing media consisting solely of mineral fibers, but such growing media have an insufficient water retention ability when transplanted to other growing media, e.g. transplantation out of doors. Thus, mineral fiber containing plant growing media which solely consist of mineral fibers will generally dry out at transplantation thus causing damage to the plants.

Furthermore, attempts have been made to increase the density of plant growing media which consist solely of mineral fibers to achieve media having an increased water retention ability. However, such dense growing media having an increased water retention ability are too compact for plant roots to penetrate. Moreover, the hysteresis of such media is so small that the supply of air to the roots of the plants is inconveniently inhibited.

NL patent application No. 01724/88 discloses plant growing blocks comprising mineral fibers and a soil in a homogenous mixture and in such proportions that the form of the blocks is substantially maintained at any water content. These media have a good water retention ability, but they are too dense for the growing of certain plants. In addition, the soil types used are expensive and, besides, soil is associated with the disadvantage of being filled with seeds and microorganisms that must be rendered harmless by desinfection before use, which treatment is laborious, costly, and which may under certain circumstances be hazardous to the environment.

Furthermore, attempts have been made to use mineral containing mixtures comprising sphagnum as plant growing media, but the properties of these plant growing media vary widely because of the inhomogeneity and varied composition of sphagnum. Besides, sphagnum containing growing media suffer from the disadvantage that it does not have a lasting structure due to sphagnum being decomposed in time.

The purpose of the present invention is to provide a mineral fiber containing plant growing medium which has substantially improved water retention properties compared to known plant growing media consisting of mineral fibers and which does not require desinfection before use.

SUMMARY OF THE INVENTION

This purpose is achieved according to the invention with a plant growing medium, characterised in that it comprises a carbonaceous material, which on a water free and ash free basis comprises from about 60 to 75 percent by weight of carbon, from about 17 to about 33 percent by weight of oxygen and from about 3 to about 8 percent by weight of hydrogen.

Surprisingly, it has been found that plant growing media which comprise a mixture of mineral fibers and the above defined carbonaceous material have particularly good water retention properties. Thus, when using a plant growing medium according to the invention, a water content at drainage can be achieved which at suction pressures of from about 25 cm to 150 cm that may, e.g., correspond to field conditions is several times higher than the water content of a plant growing medium consisting solely of mineral fibers. Moreover, a water content several times higher than that of a rewetted plant growing medium consisting solely of mineral fibers can be achieved at rewetting.

DE-A-3.425.934 discloses a plant growing medium consisting of an artificial foam material and comprising comminuted brown coal and/or bark and/or peat or other organic substances and/or other materials required for plant cultivation.

This prior art plant growing medium is of a different type than the medium of the invention, and also brown coal differs from tile carbonaceous material used in the medium of the invention both in composition and properties, brown coal, e.g., lacking or having a reduced water retention ability as compared to the carbonaceous material.

DD-A-227.872 discloses a process for preparing plant growing pellets consisting of mineral wool and comprising a nutrient additive in the form of brown coal ashes and organic substances.

The prior art plant growing medium disclosed in DD-A-227.872 does not comprise any water retention agent.

The carbonaceous material used in the plant growing medium of the invention, which in the following will be referred to as lignite, is a brown or black carbonaceous mineral material which is formed from peat in the deeper structures of the earth's crust at moderate pressure as it is an intermediate stage between peat and coal in the process of coal formation. Lignite is an extraordinarily inexpensive resource as the deeper structures of the earth's crust contain huge reserves of this material and as it is easy to extract being found closely beneath the earth's surface in thick layers.

Water free, ash free lignite contains from about 60 to about 75 percent by weight of carbon, from about 17 to about 33 percent by weight of oxygen from about 3 to about 8 percent by weight of hydrogen, from about 0.1 to about 10 percent by weight of sulphur, and from about 0.4 to about 3 percent by weight of nitrogen. An example of a typical composition of lignite is 64 percent by weight of carbon, 5 percent by weight of hydrogen, 27 percent by weight of oxygen, 1 percent by weight of nitrogen, and 3 percent by weight of sulphur.

Because lignite is a mineralized organic material, it contains neither seeds nor micro-organisms, and consequently desinfection is not required.

Furthermore, lignite presents the advantage of retaining its hydrophilic properties, i.e. its rewetting ability, even after excessive drying out. Lignite has a very high ion exchange capacity, i.e., a good ability to adsorb nutrients in the form of ions, which is particularly advantageous when the plant growing medium is used for out-of-doors transplantation. Besides, lignite is easy to use in the production.

The plant growing medium according to the present invention preferably comprises from 5 to 80 percent by weight, more preferably from 20 to 50 percent by weight, of lignite and preferably from 20 to 95 percent by weight, more preferably from 50 to 80 percent by weight, of mineral fibers.

The plant growing medium according to the present invention may also optionally contain clay. By the addition of clay that contains capillary pores the water retention curve is displaced further upwards, i.e., the water retention and rewetting ability is increased concurrently with the decrease of the hysteresis.

The plant growing medium contains preferably from 5 to 15 percent by weight of clay.

In addition, the plant growing medium may optionally comprise traditionally used manufacturing agents and aids, such as binding agents, tensides, superabsorbents, and agents for controlling the air content and the water retention properties of the growing medium, such as expanded clay, foam plastic compounds, vermiculite, perlite, cellulose-containing compounds and top soil.

Most known polymers both natural polymers, such as starch, and artificially produced polymers, such as phenol formaldehyde resin may be employed as a binding agent. Phenol formaldehyde resin is preferably used.

Traditionally employed tensides comprise, e.g., various ethylene and propylene oxide condensates.

The ready to use plant growing medium may be present in a bound form, such as in the form of blocks, slabs or mats, as granules or as loose crumbles, or in the unbound, loose form.

The term "mineral fibers" comprises rockwool fibers, slagwool fibers, and glasswool fibers plus naturally occurring fiber materials, such as wollastonite.

BRIEF DESCRIPTION OF THE FIGURE

The accompanying figure depicts the water content in fiber blocks according to the prior art and according to the invention based on applied suction pressure.

In the following the invention will be described in detail with reference to the following example.

EXAMPLE

The water retention properties of two different plant growing blocks was determined by the determination of water retention curves for the two types of blocks. The retention curve for a given medium was determined from measurements which were performed by placing the test object on a nivelled layer of sand, wherein the suction pressure can be regulated continuously via the height of a water saturated zone in the sandlayer.

One of the examined blocks consisted of 60 percent by weight of lignite, 35 percent by weight of mineral fiber, and 5 percent by weight of binding agent and the density was 353 kg/m$^3$, while the other block consisted solely of bound mineral fibers having a density of 70.9 kg/m$^3$.

The obtained results appear from the figure which in the form of a curve shows the connection between suction pressure and water content for the two blocks first during increasing suction pressure and then during decreasing suction pressure (two curve parts for each block) as each curve shows an average of four measurements.

It is seen from the drawing that the water content of the lignite containing block compared to the block which solely consisted of mineral fibers was increased particularly at greater suction pressures, i. e., improved water retention ability, and that the lignite containing block showed much less hysteresis, i. e., an improved rewetting ability.

I claim:

1. Plant growing medium comprising mineral fibers and an agent for increasing water retention ability, said agent consisting of lignite which on a water free and ash free basis comprises from about 60 to about 75 percent by weight of carbon, from about 17 to about 33 percent by weight of oxygen and from about 3 to about 8 percent by weight of hydrogen.

2. Plant growing medium according to claim 1, comprising from 5 to 80 percent by weight of said lignite and from 20 to 95 percent by weight of mineral fibers.

3. Plant growing medium according to claim 2, comprising from 20 to 50 percent by weight of said lignite and from 50 to 80 percent by weight of mineral fibers.

4. Plant growing medium according to claim 1, further comprising clay.

5. Plant growing medium according to claim 4, comprising from 5 to 15 percent by weight of clay.

6. Plant growing medium according to claim 1, further comprising a binding agent in an amount sufficient to bind the mineral fibers and said lignite together.

7. Plant growing medium according to claim 1, further comprising a tenside in an amount sufficient to increase the water absorption ability of the medium.

* * * * *